3,523,117
DIOXAZINE DYESTUFFS
André Pugin, Riehen, and Kurt E. Burdeska, Basel, Switzerland, assignors to J. R. Geigy A.G., Basel, Switzerland
No Drawing. Continuation of application Ser. No. 378,076, June 25, 1964. This application Aug. 16, 1968, Ser. No. 755,022
Claims priority, application Switzerland, July 2, 1963, 8,255/63, 8,256/63
Int. Cl. C07d 87/30
U.S. Cl. 260—246          7 Claims

ABSTRACT OF THE DISCLOSURE

The present invention concerns new, pure dyestuffs of the dioxazine series, their use for the pigmenting of polymeric organic material, especially of lacquers and printing inks as well as, as industrial product, the polymeric organic material pigmented therewith.

---

This application is a continuation of application Ser. No. 378,076, filed June 25, 1964, now abandoned.

It is known that a dispersion dyestuff of the dioxazine series which contains chlorine atoms and methoxy groups in the benzo radical can be produced by reacting 3,6-dichloro - 2,5 - bis - (3'-chloro-4'-methoxyphenylamino)-1,4-benzoquinone under ring closing conditions. In this way an unsatisfactory yield of a brown pigment which has slight fastness to light and solvents is obtained. Its absorption maxima in α-chloronaphthalene are 518 and 555 mμ.

It has now been found that orange and blueish to bordeaux red, pure pigments which are fast to light and solvents, and are of great colour strength are surprisingly obtained by reacting a dianil of formula

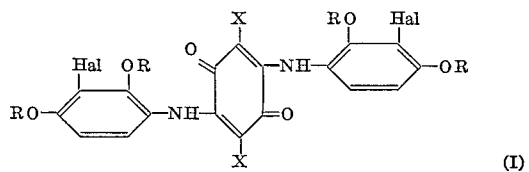

under ring closing conditions and, optionally, in the presence of an acid condensing agent, to form a triphenodioxazine compound of formula

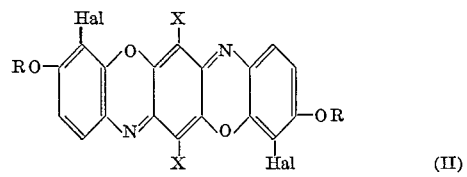

in which formulas

Hal represents chlorine or bromine
X represents hydrogen, chlorine, bromine or a methyl group and
R represents a lower alkyl group, a cycloalkyl group, an aralkyl or aryl group which latter two groups may contain non-ionogenic ring substituents.

In the triphenodioxazine compounds of Formula II according to the invention, X is preferably chlorine, bromine or hydrogen, and optimally chlorine.

When R represents a lower alkyl group, it is mainly the methyl group or also the ethyl group. When R is a cycloalkyl radical, it is in particular the cyclohexyl radical; when R is an aralkyl group, it is preferably the benzyl group. As aryl group R is especially an unsubstituted or substituted phenyl or an unsubstituted naphthyl. When R is an aralkyl or phenyl group having non-ionogenic ring substituents, these substituents are preferably halogens such as chlorine or bromine, lower alkyl groups such as the methyl or ethyl group; or lower alkylsulfonyl groups, preferably the methylsulfonyl group. R is optionally an alkyl group having from one to two carbon atoms or a phenyl group which is substituted by halogen atoms, lower alkyl groups, lower alkoxy groups, more preferably the methyl group, the 4-chlorophenyl, 2,4-dichlorophenyl, 3,4-dimethylphenyl or 3,5-dimethylphenyl group.

Compared with the other dyestuffs falling under Formula II those of the formula

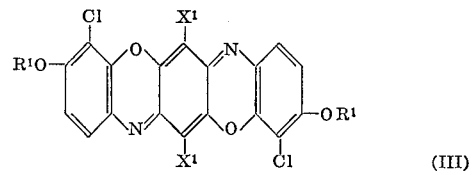

wherein $X^1$ represents hydrogen, chlorine or bromine and
$R^1$ represents alkyl of from 1 to 2 carbon atoms, chlorophenyl, bromophenyl, lower alkyl-phenyl and lower alkoxy-phenyl, are particularly readily accessible and are distinguished by high color strength, purity of shade, and also good fastness to overlacquering in prints.

Starting compounds of Formula I used according to the invention, in which X is chlorine or bromine, are obtained by condensation of 1 mol of chloranil or bromanil with 2 mols of a 3-halogeno-2,4-bis-alkoxy-, bis-cycloalkoxy-, bis-aralkoxy- or bis-aryloxy-1-amino-benzene, of which the aralkoxy or the aryloxy substituent may be ring substituted by non-ionogenic groups, "3-halogeno" meaning, of course, 3-chloro- or 3-bromo.

This condensation is performed in the presence of an acid binding agent such as sodium acetate or magnesium oxide. Starting compounds of Formula I wherein X is hydrogen or a methyl group are obtained by reacting equivalent amounts of 1,4-benzoquinone or of 2,5-dimethyl-1,4-benzoquinone with 3-halogeno-2,4-bis(alkoxy-, cycloalkoxy-, aralkoxy- or aryloxy)-1-aminobenzene while reducing half of the quinone used to the hydroquinone in alcohols, especially in ethanol or isopropanol, the reaction optionally being performed in the presence of acetic acid.

The reaction to close the ring of the dianil of Formula I to form the dioxazine dyestuff of Formula II is preferably performed by heating the dianil to above 150° C., especially to 200–220° C., more preferably in high boiling organic solvents and, optionally, in the presence of an acid condensing agent.

Suitable, high boiling, organic solvents are, e.g. optionally halogenated and/or nitrated, aromatic hydrocarbons of the benzene series such as di- or tri- chlorobenzene or nitrobenzene, or of the naphthalene series such as naphthalene or α-chloro- or α-methyl-naphthalene, or high boiling alcohols such as benzyl alcohol or ethylene glycol, or high boiling ethers, e.g. polyalkylene glycol monoalkyl or dialkyl ethers such as diethylene glycol mono- and dimethyl or mono- and di-ethyl ether, or high boiling esters, e.g. benzoates or phthalates of alkanols such as ethyl benzoate or butyl benzoate, diethyl or dibutyl phthalate.

Examples of acid condensing agents are, especially the acid halides of carboxylic or sulphonic acids such as benzoyl chloride or benzene sulphonic acid chloride, however, thionyl chloride, phosphorus pentachloride, sulphonic acid, hydrobromic acid, hydrochloric acid or metal chlorides such as aluminium chloride or zinc chloride.

It is also possible to produce the dianil of Formula I and to ring close this to form the triphenodioxazine of Formula II in one step, without intermediate isolation of the dianil.

The pure triphenodioxazine compounds of Formula II obtained according to the invention have the characteristic properties of the dioxazine dyestuffs, for example, blue colour of the solution in concentrated sulphuric acid, metallic shimmer of the crystals and fluorescence in 1,2-dichlorobenzene.

For use as pigments, these dioxazine dystuffs are brought into a finely dispersed form by, for example, precipitating them from sulphuric acid solution with water. They are finely distributed more advantageously however, by milling or kneading the crude products in the presence of milling auxiliaries such as inorganic or organic salts which can afterwards be removed with solvents and, optionally, in the presence of additional milling auxiliaries such as organic solvents, acids or bases.

In this way, finely dispersed pigments are prepared of soft texture and remarkable color strength and, at times, of good purity of shade. They can be used for the pigmenting of polymeric organic material, especially varnishes, rubber, lacquers, e.g. stoving or nitro lacquers, and plastic such as polyvinyl chloride, polyethylene or polypropylene. They are also particularly suitable for the production of printing inks for paper as well as for the coloring of viscose and cellulose materials in the mass. The red and red-brown dyeings and prints attained therewith are distinguished by great color strength; they have good stability to solvents, cross-lacquering, rubbing, light and heat.

Triphenodioxazine compounds of Formula II wherein R is a methyl group, 4-chlorophenyl, 2,4-dichlorophenyl, 3,4-dimethylphenyl or 3,5-dimethylphenyl group, are especially suitable for the production of printing inks. They have a vivid red shade of a purity which, up to the present, has only been attained by precipitates of basic dyestuffs with complex phosphomolybdic acids. However, the color strength and light fastness and, especially of the preferred compounds of Formula III, also the color strength and fastness to solvents and cross-lacquering of the new dioxazine dyestuffs are superior to the aforesaid known precipitates.

Those new pigments are particularly suitable for three-colour printing as their shade remains almost constant in all concentrations used therefor, whilst the red pigments of the azo series, which have been the usual up to now for this purpose, have a noticeably more yellowish shade in high concentrations than in stronger dilution.

Another aspect of the present invention concerns another class of pure dyestuffs of the dioxazine series, their use for the pigmenting of polymeric organic material, in particular lacquers and printing inks as well as, as industrial product, the polymeric organic material pigmented therewith.

Red, Bordeaux and brown pigments which possess as surprisingly good properties as the pigments of Formula II are obtained by reacting a dianil of the formula

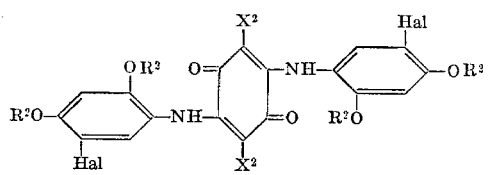

(IV)

under ring closing conditions, optionally in the presence of an acid condensing agent, to form a triphenodioxazine compound of the formula

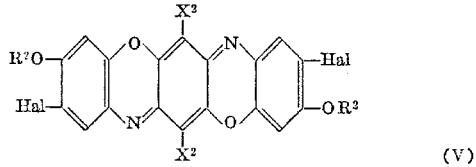

(V)

in which formulas $X^2$ represents hydrogen, chlorine, bromine, or a methyl group, $R^2$ represents a phenyl group which is unsubstituted or substituted by non-ionogenic substituents, and Hal represents bromine or, preferably, chlorine.

In the triphendioxazine dyestuffs of Formula V, $X^2$ is preferably chlorine or bromine, and optimally chlorine.

Insofar as $R^2$ is a phenyl group containing non-ionogenic substituents, examples of such substituents of the benzene ring are halogens such as, chlorine or bromine, lower alkyl group such as the methyl or ethyl group, lower alkoxy groups such as the methoxy or ethoxy group or lower alkylsulfonyl groups such as the methylsulfonyl group. Preferably R is an unsubstituted phenyl group or phenyl substituted by chlorine, bromine, methyl or methoxy.

Starting compounds of Formula IV in which $X^2$ is chlorine or bromine used according to the invention are obtained by condensing 1 mol of chloranil or bromanil with 2 mols of a 2,4-bisphenoxy-5-bromo- or 5-chloro-1-aminobenzene which may contain non-ionogenic being stituents in the phenoxy radicals, the condensation being performed in the presence of an acid binding agent such as sodium acetate or magnesium oxide. Starting compounds of Formula IV wherein $X^2$ is hydrogen or the methyl group are obtained by reacting equivalent amounts of 1,4-benzoquinone or 2,5-dimethyl-1,4-benzoquinone and the 5-bromo- or 5-chloro-2,4-bisphenoxy-1-aminobenzene mentioned above while reducing half the quinone used to the hydroquinone. The reaction is performed in alcohols, especially in ethanol or isopropanol, optionally in the presence of acetic acid.

The ring closing reaction of the dianil of Formula IV to form the triphenodioxazine of Formula V is preferably performed by heating the dianil to above 150° C., especially to 200 to 220° C., more preferably in high boiling organic solvents and optionally in the presence of an acid condensing agent.

Suitable high boiling organic solvents are, e.g. optionally halogenated and/or nitrated aromatic hydrocarbons of the benzene series such as di- or trichlorobenzene or nitrobenzene, or of the naphthalene series such as naphthalene or α-chloro- or α-methyl- naphthalene, or high boiling alcohols such as benzyl alcohol or ethylene glycol, or high boiling ethers, e.g. polyalkylene glycol monoalkyl or dialkyl ethers such as diethylene glycol monomethyl, monoethyl, dimethyl or diethyl ether, or high boiling esters, e.g. benzoates or phthalates of alkanols such as ethylbenzoate or butylbenzoate or diethylphthalate or dibutylphthalate.

Examples of acid condensing agents are especially the acid halides of carboxylic or sulphonic acids such as benzoyl chloride or benzene sulphonic acid chloride, moreover, thionyl chloride, phosphorus pentachloride sulphuric acid, hydrochloric acid, hydrobromic acid or metal chlorides such as aluminum chloride or zinc chloride.

It is also possible to produce the dianil of Formula IV and to ring close such compound to form the triphenodioxazine of Formula V in one step, without the dianil having to be isolated.

The new pure triphenodioxazine compounds of Formula V obtained according to the invention have the characteristic properties of dioxazine dyestuffs, for example, blue colour of the solution in concentrated sulphuric acid, metallic shimmer of the crystals and fluorescene in 1,2-dichlorobenzene.

For use as pigments, these dioxazine dyestuffs are brought into a finely dispersed form by, for example, precipitating them with water from sulphuric acid or dichloroacetic acid solution. Fine distribution is attained more advantageously, however, by milling or kneading the crude products in the presence of milling auxiliaries such as inorganic or organic salts which can later be removed with solvents and, optionally, by additional milling auxiliaries such as organic solvents, acids or bases.

In this way, finely dispersed pigments are prepared of soft texture and remarkable color strength and, at times of good purity of shade. They can be used for the pigmenting of polymeric organic material, especially varnishes, rubber, lacquers, e.g. stoving or air-drying lacquers or nitrolacquers, and plastics such as polyvinyl chloride, polyethylene or polypropylene. They are also particularly suitable for the production of printing inks for paper as well as for the coloring of viscose and cellulose materials in the mass. The red, bordeaux colored and brown dyeings and prints attained therewith are distinguished by high grade color strength. Especially, the pigments of the preferred group falling under Formula V, namely those in which $X^2$, $R^2$ and Hal have the preferred meanings given above, have good stability to solvents, cross-lacquering, rubbing, light and heat.

The expression "lower alkyl" whenever used in this specification and in the appended claims, means an alkyl radical of from 1 to 4 carbon atoms.

Further details can be seen from the following non-limitative examples. The temperatures are given therein in degrees centigrade.

EXAMPLE 1

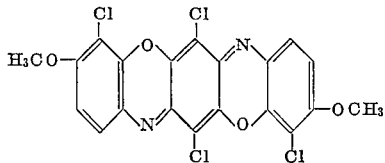

54.8 g. of 3,6-dichloro-2,5-bis-(2',4'-dimethoxy-3'-chloro-phenylamino)-1,4-benzoquinone in 400 g. of trichlorobenzene, in the presence of 28.1 g. of benzoyl chloride, are heated for 3½ hours at 190°. The suspension is filtered at 100° and the crystalline residue is washed with ethanol, water and acetone. After drying, 43.3 g. of 1,5,9,10-tetrachloro-2,6-dimethoxy-triphenodioxazine are obtained as brown crystals having a green shimmer. ($\lambda$ max. in $\alpha$-chloronaphthalene 508 and 546 m$\mu$).

15 g. of this crude product and 45 g. of anhydrous calcium chloride are milled for 1½ hours in a ball mill containing iron balls each of 15 mm. diameter weighing, in all, 3 kg., 600 g. The milled goods are then extracted with dilute hydrochloric acid, the residue is filtered off, washed with water and dried in vacuo at 60°. A red powder of soft texture is obtained from which printing inks can be produced. They produce very pure blueish red prints of strong colour which are very fast to light.

The 1,4-benzoquinone compound used as starting material is produced as follows: 9.1 g. of magnesium oxide are added to a solution of 2,4-dimethoxy-3-chloroaniline (B.P.$_{11mm}$ 160–161°) in 300 g. of isopropanol and 200 ml. of water and then 55.5 g. of chloranil are added within 1½ hours by means of a spatula. After heating for 2 hours at 60°, the brown suspension is filtered and the residue is washed with ethanol and water and dried. Yield: 116 g. The 2,4-dimethoxy-3-chloroaniline is produced by reacting 2,3,4-trichloro-1-nitro-benzene with potassium methylate and reducing the nitro group.

EXAMPLE 2

When in Example 1 instead of 54.8 g. 3,6-dichloro-2,5-bis - (2',4'-dimethoxy - 3' - chloro-phenylamino) - 1,4-benzoquinone, 60.4 g. of 3,6-dichloro-2,5-bis-(2',4'-diethoxy-3'-chloro-phenylamino)-1,4-benzoquinone are used with otherwise the same procedure as described, then a red pigment dyestuff is obtained with similar properties.

EXAMPLE 3

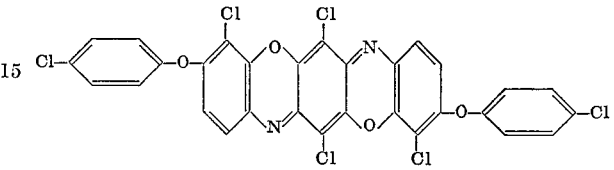

11 g. of 3,6-dichloro-2,5-bis-[2',4'-bis-(4''-chloro-phenoxy)-3'-chloro-phenylamino]-1,4-benzoquinone in 90 g. of nitrobenzene, in the presence of 9.6 g. of benzoyl chloride, are heated for 3 hours at 180°. The suspension is filtered cold and the residue is washed with ethanol, water and acetone. After drying, 5.7 g. of 1,5,9,10-tetrachloro-2,6-bis-(4'-chlorophenoxy) - triphenodioxazine is obtained which, after milling with salt as described in Example 1, is a blueish red pigment of high grade colour strength and purity. It has good fastness to light.

The 1,4-benzoquinone derivative used as starting material is produced by condensing 1 mol of chloranil with 2 mols of 2,4-bis-(4'-chlorophenoxy)-3-chloroaniline. The later is produced by reacting 2,3,4-trichloro-1-nitrobenzene with 2 mols of the potassium salt of p-chlorophenol and then reducing the nitro group.

If in the above example, instead of 11 g. of 3,6-dichloro-2,5-bis-[2',4'-bis-(4''-chloro-phenoxy) - 3'-chloro-phenyl-amino-]1,4-benzoquinone, 10 g. of 3,6-dichloro-2,5-bis-(2',4' - bis - phenoxy-3'-chlorophenylamino)-1,4-benzoquinone or 11 g. of 3,6-dichloro-2,5-bis-[2',4'-bis-(2''-chlorophenoxy) - 3' - chlorophenylamino] - 1,4-benzoquinone are used as starting materials and otherwise the procedure described in the example is followed, then products are obtained which, after milling with salt, are light-fast, orange-brown pigments.

EXAMPLE 4

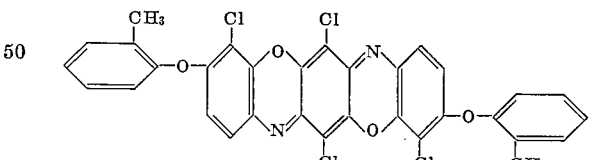

20 g. of 3,6-dichloro-2,5-bis-[2,4'-bis-(2''-methylphenoxy)-3'-chloro - phenylamino] - 1,4 - benzoquinone in 130 g. of trichlorobenzene are heated for 3 hours at 210° while stirring. The suspension is filtered cold and the residue is washed with ethanol and acetone. After drying, 9,5 g. of 1,5,9,10-tetrachloro-2,6-bis-(2'-methylphenoxy)-triphenodioxazine are obtained which, after milling with salt as described in Example 1, is a blueish red pigment of high grade colour strength and purity. It has good fastness to light.

The 1,4-benzoquinone compound used as starting material is obtained by condensation of 1 mol of chloranil with 2 mols of 2,4-bis-(2'-methylphenoxy)-3-chloroaniline. The latter is produced by reacting 2,3,4-trichloro-1-nitrobenzene with 2 mols of potassium salt of o-methylphenol and then reducing the nitro group.

Pigment dyestuffs having similar properties are obtained if, in this example, the 3,6-dichloro-2,5-bis-[2',4'-bis-(2''-methylphenoxy) - 3' - chloro-phenylamino]-1,4- benzoquinone compounds given in the second column of the following Table I.

TABLE I

| Example No. | Starting 1,4-benzoquinone | Colour of the dioxazine dyestuff |
|---|---|---|
| 5 | 3,6-dichloro-2,5-bis-[2',4'-bis-(3'',5''-dimethylphenoxy)-3'-chloro-phenylamino]-1,4-benzoquinone. | Blueish red. |
| 6 | 3,5-dichloro-2,5-bis-[2'-4'-bis-(2'',4''-dichlorophenoxy)-3'-chloro-phenylamino]-1,4-benzoquinone. | Red. |
| 7 | 3,6-dichloro-2,5-bis-[2',4'-bis-(4''-methoxy-phenoxy)-3'-chloro-phenylamino]-1,4-benzoquinone. | Yellowish red. |
| 8 | 3,6-dichloro-2,5-bis-[2',4'-bis-(2'',3''-dimethyl-phenoxy)-3'-chloro-phenylamino]-1,4-benzoquinone. | Scarlet. |
| 9 | 3,6-dichloro-2,5-bis-[2',4'-bis-(2'''-methyl-4''-chlorophenoxy)-3'-chloro-phenylamino]-1,4-benzoquinone. | Bordeaux. |
| 10 | 3,6-dichloro-2,5-bis-[2',4'-bis-(3'', 4''-dimethylphenoxy)-3'-chlorophenylamino]-1,4-benzoquinone. | Blueish red. |
| 11 | 3,6-dichloro-2,5-bis-[2'-4'-bis-(4''-bromo-phenoxy-3'-chlorophenylamino]-1,4-benzoquinone. | Red. |

EXAMPLE 12

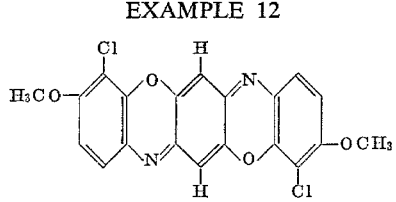

13.85 g. of 2,5-bis-(2',4'-dimethoxy-3'-chlorophenylamino)-1,4-benzoquinone in 150 g. of trichlorobenzene, in the presence of 8.2 g. of benzoyl chloride, are heated for 3 hours at 190° while stirring. The residue is filtered off cold and washed with trichlorobenzene, ethanol and acetone. It is purified by extracting in a Soxhlet apparatus first with o-dichlorobenzene and then with α-chloronaphthalene. The pure 1,5-dichloro-2,6-dimethoxytriphenodioxazine crystallises from the α-chloronaphthalene extract in thick red-brown crystals.

The 1,4-benzoquinone derivative used as starting material is produced by condensing 1 mol of 1,4-benzoquinone with 1 mol of 2,4-dimethoxy-3-chloroaniline in a mixture of ethanol and glacial acetic acid.

A similar dyestuff is obtained by ring closing the anil, obtained according to the method described in the previous paragraph from 2,5-dimethyl-1,4-benzoquinone to the 1,5-dichloro-2,6 - dimethoxy - 9,10 - dimethyl-triphenodioxazine under the conditions described in the first paragraph.

EXAMPLE 13

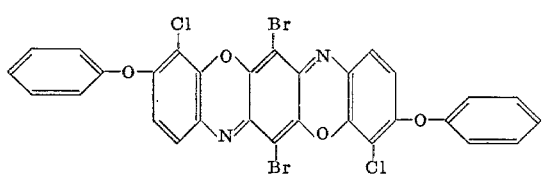

20 g. of 3,6-dibromo-2,5-bis[2',4'-diphenoxy-3'-chlorophenylamino]-1,4-benzoquinone are heated in 130 g. of trichlorobenzene for 1 hour to 200° while stirring and in the presence of 10 g. of benzoyl chloride. The red suspension is filtered off cold and the residue is washed with ethanol and acetone.

After milling with salt as described in Example 1, the wine-red residue yields a brownish red powder from which printing dyes, giving colourfast, yellowish red prints with fastness to light, can be produced.

The 1,4-benzoquinone derivative used as starting material is obtained by condensing 1 mol of bromanil with 2 mols of 2,4-diphenoxy-3-chloroaniline.

EXAMPLE 14

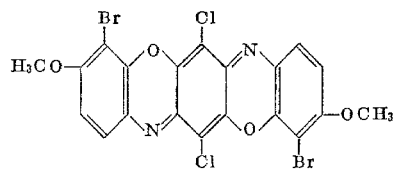

31.85 g. of 3,6 - dichloro-2,5-bis-(2',4'-dimethoxy-3'-bromophenylamino)-1,4-benzoquinone are heated for 3½ hours to 190° in 250 g. of trichlorobenzene in the presence of 14.05 g. of benzoylchloride. The suspension is filtered off at 100° and the crystalline residue washed with methanol, water and acetone. After drying, 24 g. of 1,5-dibromo - 2,6-dimethoxy-9,10-dichloro-triphenodioxazine are obtained as dark reddish crystals. After milling with salt, as described in Example 1, a blueish-red pigment is obtained of good colour strength and purity and with good fastness to light.

The 1,4-benzoquinone-compound used as starting material is produced by condensing 2 mol of 2,4-dimethoxy-3-bromaniline with 1 mol of chloranil in the presence of magnesium oxide in aqueous isopropanol. The 2,4-dimethoxy-3-bromaniline (B.P.$_{15\ mm.\ Hg}$ 183–184°) is obtained by reacting 2,4-dichloro-3-bromo-1-nitrobenzene (M.P. 64°) with potassium methylate, and by reducing the nitro group. The 2,4-dichloro-3-bromo-1-nitro-benzene is obtained in its turn from 2,6-dichloroaniline by replacing the amino group by bromine according to the method of Sandmeyer, and by subsequent nitration.

A blueish-red pigment having similarly good properties is obtained when 36.3 g. of 3,6-dibromo-2,5-bis-(2', 4' - dimethoxy - 3' - bromo - phenylamino) - 1,4 - benzoquinone, prepared by reacting 1 mol of bromanil with 2 mols of 2,4-dimethoxy-3-bromo-analine, are used instead of 31.85 g. of 3,6-dichloro-2,5-bis-(2',4'-dimethoxy-3'-bromo-phenylamino)-1,4-benzoquinone.

EXAMPLE 15

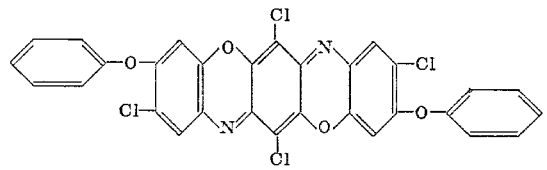

44.85 g. of 3,6 - dichloro-2,5-bis-(2',4'-diphenoxy-5'-chloro-phenylamino)-1,4-benzoquinone in 300 g. of 1-chloronaphthalene are heated for 15 minutes at 230°. The suspension is filtered cold and the crystalline residue is washed with ethanol and acetone. After drying, 27 g. of 3,7,9,10-tetrachloro - 2,6 - diphenoxytriphenodioxazine are obtained as green crystals.

15 g. of this crude product and 45 g. of anhydrous calcium chloride and 1 g. of a petroleum fraction boiling at 180–250° are milled for 1½ hours in a ball mill containing iron balls each of 15 mm. diameter, the total weight of which is 3 kg., 600 g.

The milled goods are then extracted with dilute hydrochloric acid, the residue filtered off, washed with water and dried in vacuo at 60°. A deep red powder of soft texture is obtained from which printing inks can be produced. They produce pure bordeaux red prints of food colour strength which are fast to solvents and light.

The 1,4-benzoquinone derivative used as starting material is produced by condensing 2 mols of 2,4-bis-phenoxy-5-chloro-1-aminobenzene with 1 mol of chloranil in ethanol and in the presence of sodium acetate as buffer. The 2,4-bis-phenoxy-5-chloro-1-aminobenzene is produced by reacting 2,3,5-trichloro-1-nitrobenzene with potassium phenolate and reducing the nitro group.

EXAMPLE 16

When in Example 15 instead of 44.85 g. of 3,6-dichloro - 2,5 - bis - (2',4' - diphenoxy - 5' - chloro - phenylamino)-1,4-benzoquinone the equimolar amount of 3,6-dibromo - 2,5 - bis - (2',4' - diphenoxy - 5' - chloro - phenylamino)-1,4-benzoquinone, obtained from bromanil instead of chloranil, is used with otherwise the same procedure as described, then a blueish-red pigment dyestuff with similar properties is obtained.

EXAMPLE 17

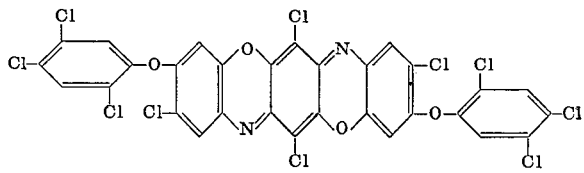

22.3 g. of 3,6-dichloro-2,5-bis-[2',4'-bis-(2",4",5"-trichlorophenoxy)-5'-chlorophenylamino]-1,4-benzoquinone in 150 g. of trichlorobenzene are heated for 2 hours at 200–210°. The suspension is filtered cold and the crystalline residue is washed with ethanol and acetone. After drying, 8 g. of 3,7,9,10-tetrachloro-2,6-bis-(2',4',5'-trichlorophenoxy)-triphenodioxazine are obtained as green needles which, after milling with salt as described in Example 15 form a bordeaux coloured pigment of high grade colour strength. Worked into stoving lacquers, this pigment produces lacquers which are fast to cross-lacquering and light.

The 1,4-benzoquinone derivative used as starting material is obtained by condensation of 1 mol of chloranil with 2 mols of 2,4-bis-(2',4',5'-trichlorophenoxy)-5-chloraniline. The latter is produced in its turn by reacting 2,4,5-trichloro-1-nitrobenzene with 2 mols of potassium salt of 2,4,5-trichloro-1-hydroxy-benzene and then reducing the nitro group.

EXAMPLE 18

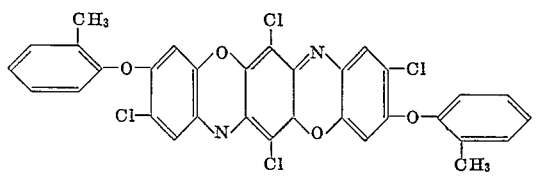

15 g. of 3,6-dichloro-2,5-bis[2',4' - bis - (2"-methylphenoxy) - 5' - chloro-phenylamino]-1,4-benzoquinone in 100 g. of trichlorobenzene are heated for 3 hours at 190° in the presence of 8 g. of benzoyl chloride. The suspension is filtered cold and the crystalline residue is washed with ethanol and acetone. After drying, 9.5 g. of 3,7,9,10-tetrachloro-2,6-bis-(2'-methylphenoxy)-triphenodioxazine are obtained as brown-green crystals which, after milling with salt as described in Example 15 form a brown-red pigment of very great colour strength which has good fastness to solvents and light.

Pigment dyestuffs with similar properties are obtained when in this example the 3,6-dichloro-2,5-bis-[2',4'-bis-(2" - methyl-phenoxy)-5'-chloro-phenylamino)]-1,4-benzoquinone is replaced by the 1,4-benzoquinones given in the second column of the following Table II.

TABLE II

| No. | Starting 1,4-benzoquinone | Colour of the pigment dyestuff |
|---|---|---|
| 19 | 3,6-dichloro-2,5-bis-[2',4'-bis-(3"-methylphenoxy)-5'-chloro-phenylamino]-1,4-benzoquinone. | Blueish-red. |
| 20 | 3,6-dichloro-2,5-bis-[2',4'-bis-(4"-methylphenoxy)-5'-chloro-phenylamino]-1,4-benzoquinone. | Do. |
| 21 | 3,6-dichloro-2,5-bis-[2',4'-bis-(2",3"-dimethylphenoxy)-5'-chloro-phenylamino]-1,4-benzoquinone. | Do. |
| 22 | 3,6-dichloro-2,5-bis-[2',4'-bis-(4"-methoxyphenoxy)-5'-chloro-phenylamino]-1,4-benzoquinone. | Orange. |

EXAMPLE 23

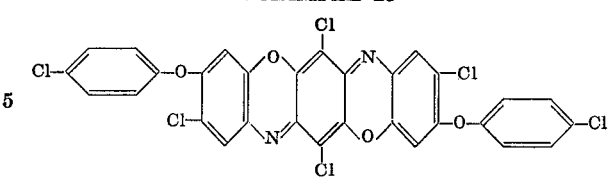

14 g. of 3,6-dichloro-2,5-bis[2',4'-bis-(4"-chlorophenoxy)-5'-chloro-phenylamino]-1,4-benzoquinone in 100 g. of α-chloronaphthalene are heated for 20 minutes at 230°. The suspension is filtered cold and the brown crystalline residue is washed with ethanol and acetone. After drying, 7.2 g. of 3,7,9,10-tetrachloro-2,6-bis-(4'-chlorophenoxy)-triphenodioxazine are obtained which, after milling with salt as described in Example 15, form an orange-brown pigment which has good fastness to solvents and light.

EXAMPLE 24

When in the Example 23, instead of 14 g. of 3,6-dichloro-2,5-[2',4' - bis - (4"-chloro - phenoxy)-5'-chlorophenylamino]-1,4-benzoquinone, 15.3 g. of 3,6-dichloro-2,5-bis-[2',4'-bis-(4"-bromo - phenoxy)-5'-chloro-phenylamino]-1,4-benzoquinone are used with otherwise the same procedure as described, then a pigment dyestuff with a yellowish-red colour is obtained.

EXAMPLE 25

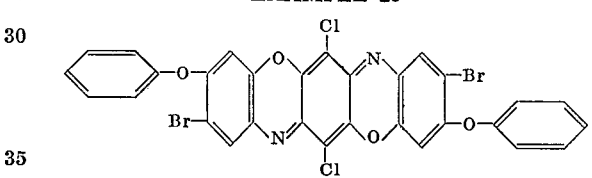

46.25 g. of 3,6-dichloro-2,5-bis-(2',4'-diphenoxy-5'-bromophenylamino)-1,4-benzoquinone are heated to 205° for three hours in 300 g. of trichlorobenzene. The suspension is filtered off cold and the crystalline residue is washed with methanol. After drying, 28 g. of 2,6-diphenoxy-3,7-dibromo-9,10-dichlortriphenodioxazine are obtained as green crystals.

After milling with calcium chloride, a dark red powder is obtained from which printing dyes can be produced. These dyes yield blueish-red prints of good colour strength and with fastness to light.

The 1,4-benzoquinone derivative used as starting material is produced by condensing 2 mols of 2,4-bis-phenoxy-5-bromo-1-aminobenzene with 1 mol of chloranil in ethanol and in the presence of sodium acetate.

The 2,4-diphenoxy-5-bromo-1-aminobenzene is produced as follows: 1,3-dichloro-4-bromobenzene is first nitrated, the 2,4-dichloro-5-bromo-1-nitrobenzene is reacted with 2 mols of potassium phenolate and the nitro group is then reduced to the amino group.

EXAMPLE 26

By using, in the preceding example, 50.6 g. of 3,6-dibromo - 2,5 - bis - [2',4'-diphenoxy-5'-bromo-phenylamino)-1,4-benzoquinone, prepared by reacting 1 mol of bromanil with 2 mols of 2,4-diphenoxy-5-bromo-1-aminobenzene, as starting material instead of 46.25 g. of 3,6-dichloro - 2,5 - bis-[2',4'-diphenoxy-5'-bromo-phenylamino)-1,4-benzoquinone, a red pigment having similarly good properties is obtained.

What is claimed is:
1. A dioxazine dyestuff of the formula

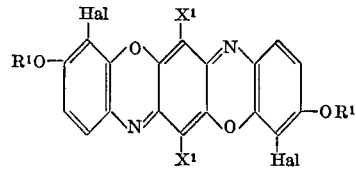

wherein $X^1$ is a member selected from the group consisting of chlorine and bromine and $R_1$ is selected from the group consisting of —$CH_3$,

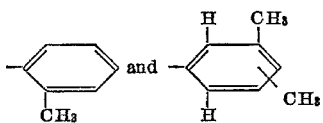

and wherein Hal is either chlorine or bromine.

2. A dioxazine dyestuff of the formula

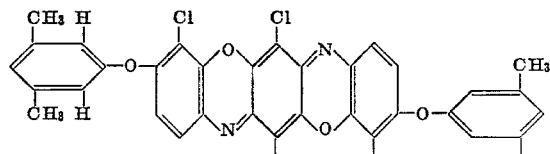

3. A dioxazine dyestuff of the formula

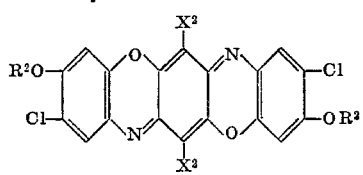

wherein $X^2$ is either chlorine or bromine and $R^2$ is either phenyl or 2,3-dimethyl phenyl.

4. A dioxazine dyestuff of the formula

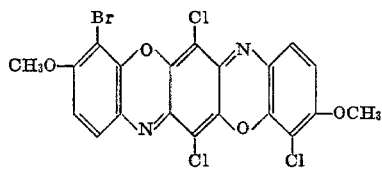

5. A dioxazine dyestuff of the formula

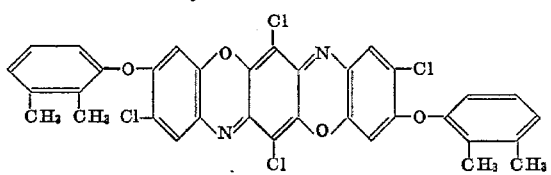

6. A dioxazine dyestuff of the formula

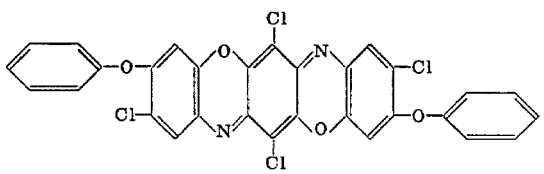

7. A dioxazine dyestuff of the formula

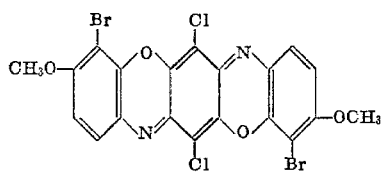

References Cited
UNITED STATES PATENTS

| | | | |
|---|---|---|---|
| 2,504,153 | 4/1950 | Robbins | 260—246 |
| 3,036,071 | 5/1962 | Frey et al. | 260—246 |
| 3,130,195 | 4/1964 | Von Der Crone | 260—246 |

FOREIGN PATENTS

| | | |
|---|---|---|
| 903,126 | 8/1962 | Great Britain. |

OTHER REFERENCES

Fierz-David et al., "Helv. Chim. Acta," vol. 22, pp. 1348–1358 (1939).

HENRY R. JILES, Primary Examiner

R. T. BOND, Assistant Examiner

U.S. Cl. X.R.

106—22, 165, 193; 260—13, 41; 8—4, 7

UNITED STATES PATENT OFFICE
CERTIFICATE OF CORRECTION

Patent No. 3,523,117              Dated  August 4, 1970

Inventor(s) ANDRE PUGIN and KURT E. BURDESKA

It is certified that error appears in the above-identified patent and that said Letters Patent are hereby corrected as shown below:

In claim 4, the leftmost part of the structural formula should appear as follows:

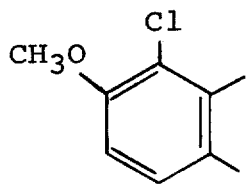

Column 4, line 35,  "being" should read --sub- --;

Column 8, line 70,  "2, 3, 5" should read --2, 4, 5--;

SIGNED AND
SEALED
JAN 12 1971

(SEAL)
Attest:

Edward M. Fletcher, Jr.
Attesting Officer

WILLIAM E. SCHUYLER, JR.
Commissioner of Patents